US012690082B2

(12) United States Patent     (10) Patent No.:   US 12,690,082 B2

Nakawaki     (45) Date of Patent:    Jul. 21, 2026

(54) WIRELESS COMMUNICATION SYSTEM, WIRELESS COMMUNICATION METHOD, WIRELESS COMMUNICATION DEVICE, AND RECORDING MEDIUM

(71) Applicant: OMRON HEALTHCARE Co., Ltd., Kyoto (JP)

(72) Inventor: Nozomi Nakawaki, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 368 days.

(21) Appl. No.: 18/448,677

(22) Filed: Aug. 11, 2023

(65) Prior Publication Data

US 2023/0389105 A1    Nov. 30, 2023

Related U.S. Application Data

(63) Continuation of application No. PCT/JP2022/003730, filed on Feb. 1, 2022.

(30) Foreign Application Priority Data

Feb. 19, 2021    (JP) ................................. 2021-025101

(51) Int. Cl.
   *H04W 76/18*      (2018.01)
   *H04W 76/11*      (2018.01)

(52) U.S. Cl.
   CPC ............ *H04W 76/18* (2018.02); *H04W 76/11* (2018.02)

(58) Field of Classification Search
   CPC ......... G06F 9/526; H04L 63/08; H04L 67/12; H04W 76/11; H04W 76/15; H04W 76/18; H04W 76/19

(Continued)

(56) References Cited

U.S. PATENT DOCUMENTS

| | | | |
|---|---|---|---|
| 2004/0067736 A1 | 4/2004 | Kamma | |
| 2013/0111025 A1* | 5/2013 | Sampathkumaran | ... G06F 9/526 |
| | | | 709/225 |
| 2022/0293231 A1* | 9/2022 | Zhou | ...................... H04L 63/08 |

FOREIGN PATENT DOCUMENTS

| | | |
|---|---|---|
| EP | 1 655 668 A1 | 5/2006 |
| JP | 2009-146206 A | 7/2009 |

(Continued)

OTHER PUBLICATIONS

Indian Office Action for Indian Application No. 202317048158, dated Feb. 7, 2025, with English translation.

(Continued)

*Primary Examiner* — Harun Chowdhury

(74) *Attorney, Agent, or Firm* — Birch, Stewart, Kolasch & Birch, LLP

(57) ABSTRACT

According to an aspect of the present invention, when a plurality of data transfer applications each transmit a communication right acquisition request in a second device that is an information terminal, a first device that is a sensing device determines permission or rejection of communication for each application of a request source based on application-specific identification information included in the communication right acquisition request and an arbitration condition stored in advance and returns a response including its determination result and the application-specific identification information to the second device. On the other hand, the second device determines success or failure of acquisition of a communication right for each application based on the determination result of the permission or rejection of communication included in the response and executes transfer processing of transmission target data by an application having succeeded in acquiring the communication right.

16 Claims, 10 Drawing Sheets

(58) Field of Classification Search
USPC .......................... 370/310, 364, 329; 709/225
See application file for complete search history.

(56)                    References Cited

FOREIGN PATENT DOCUMENTS

| | | | |
|---|---|---|---|
| JP | 2017-506009 | A | 2/2017 |
| JP | 2017-123144 | A | 7/2017 |
| JP | 2019-33401 | A | 2/2019 |

OTHER PUBLICATIONS

International Preliminary Report on Patentability and English translation of the Written Opinion of the International Searching Authority dated Aug. 31, 2023 for Application No. PCT/JP2022/003730.
International Search Report for International Application No. PCT/JP2022/003730, dated Mar. 7, 2022/.

* cited by examiner

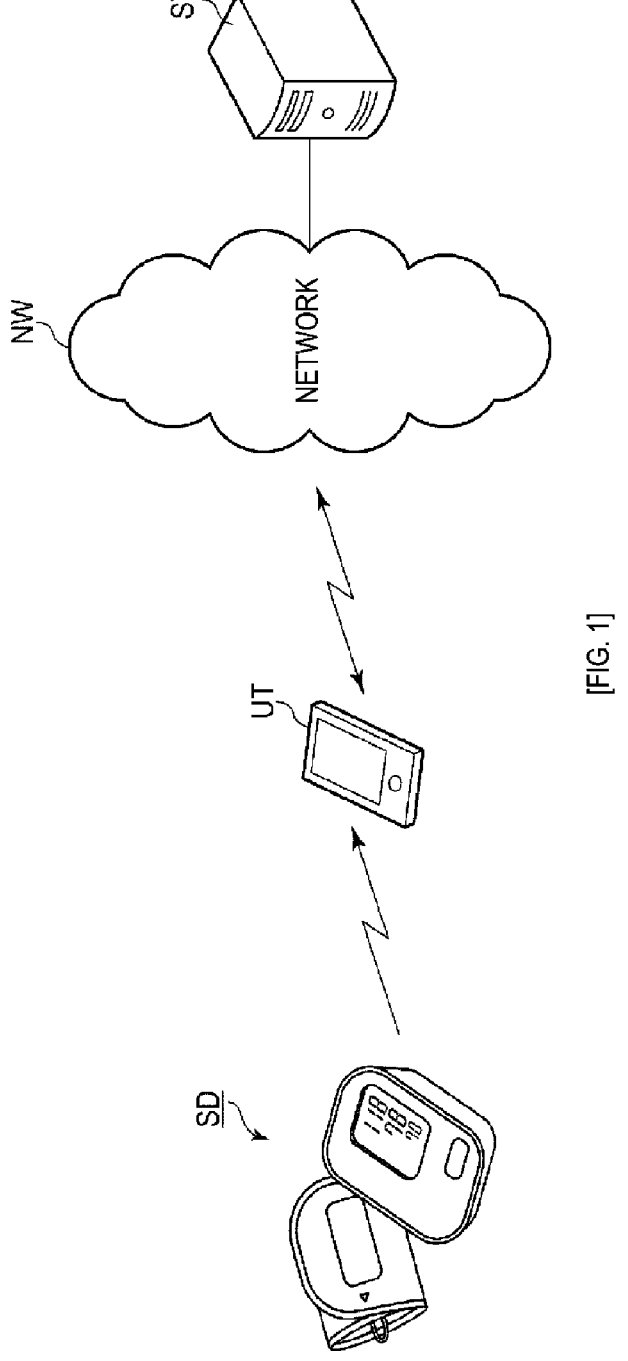
[FIG. 1]

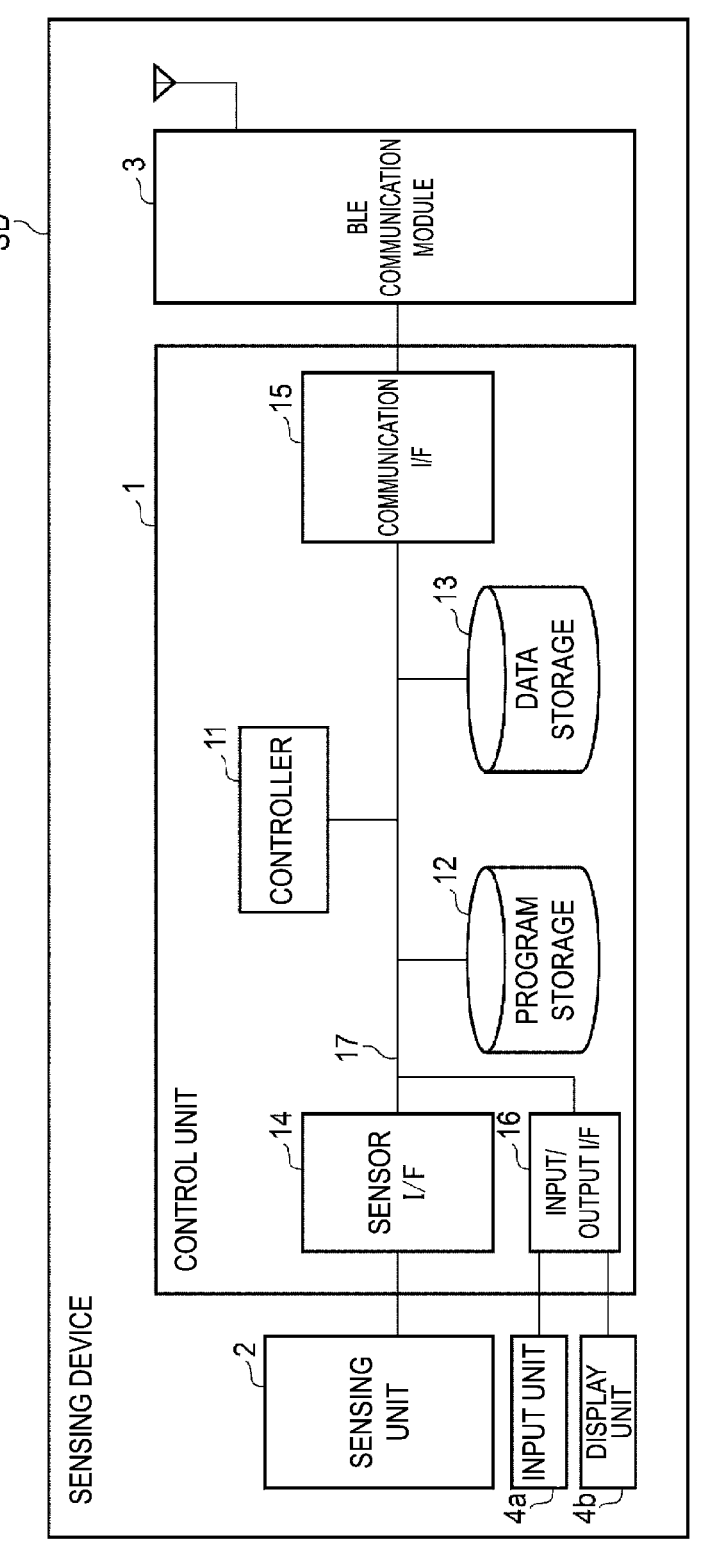
[FIG. 2]

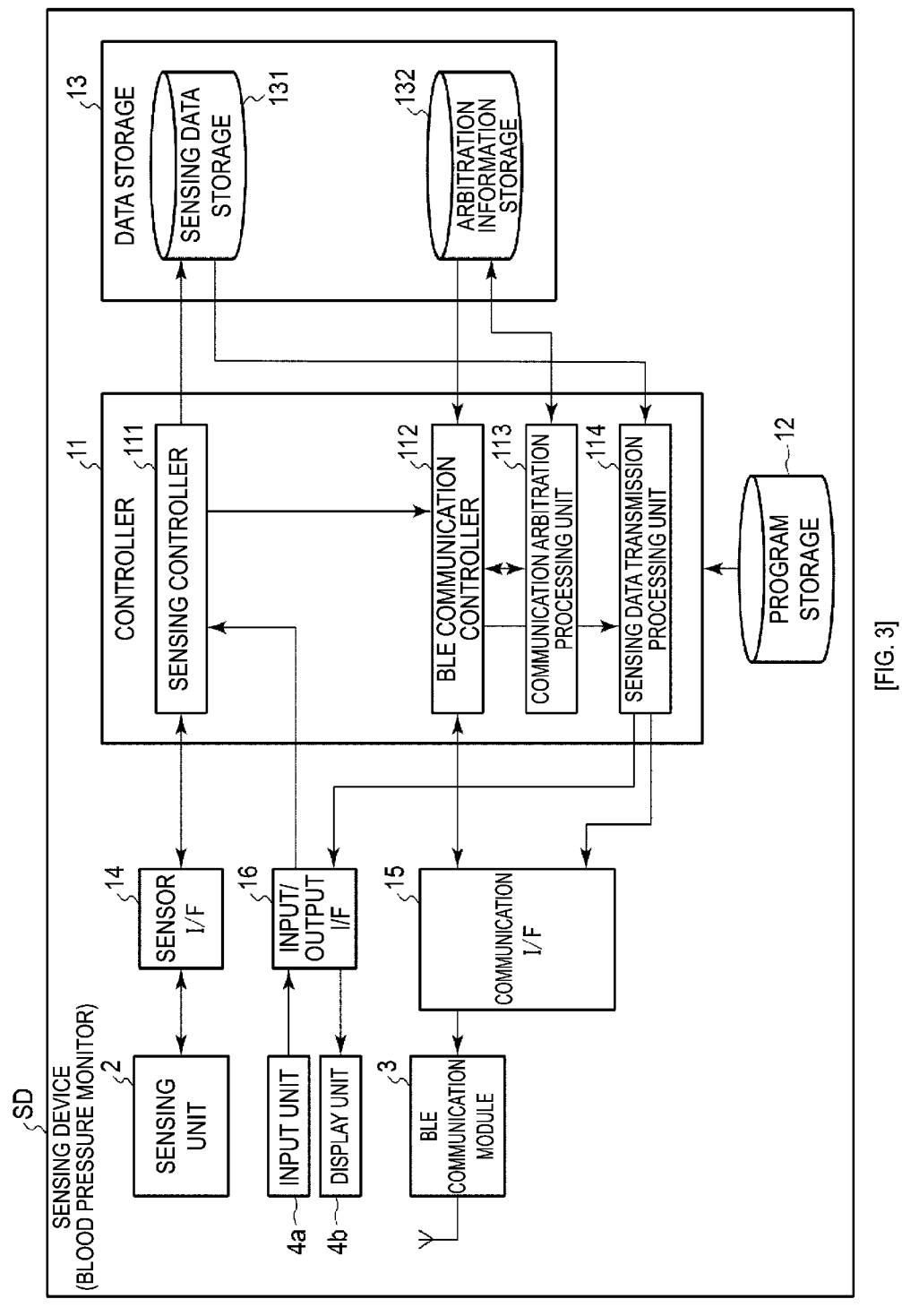
[FIG. 3]

[FIG. 4]
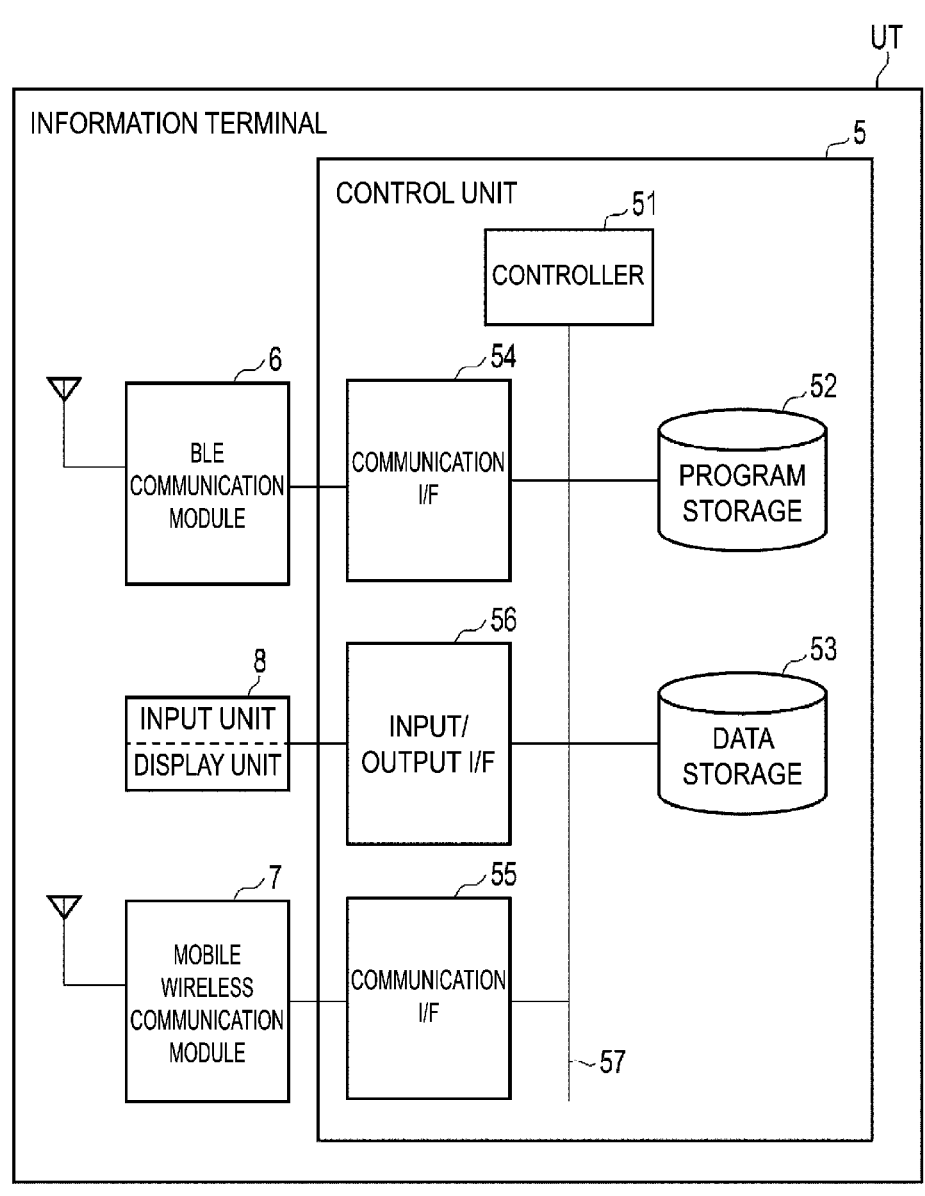

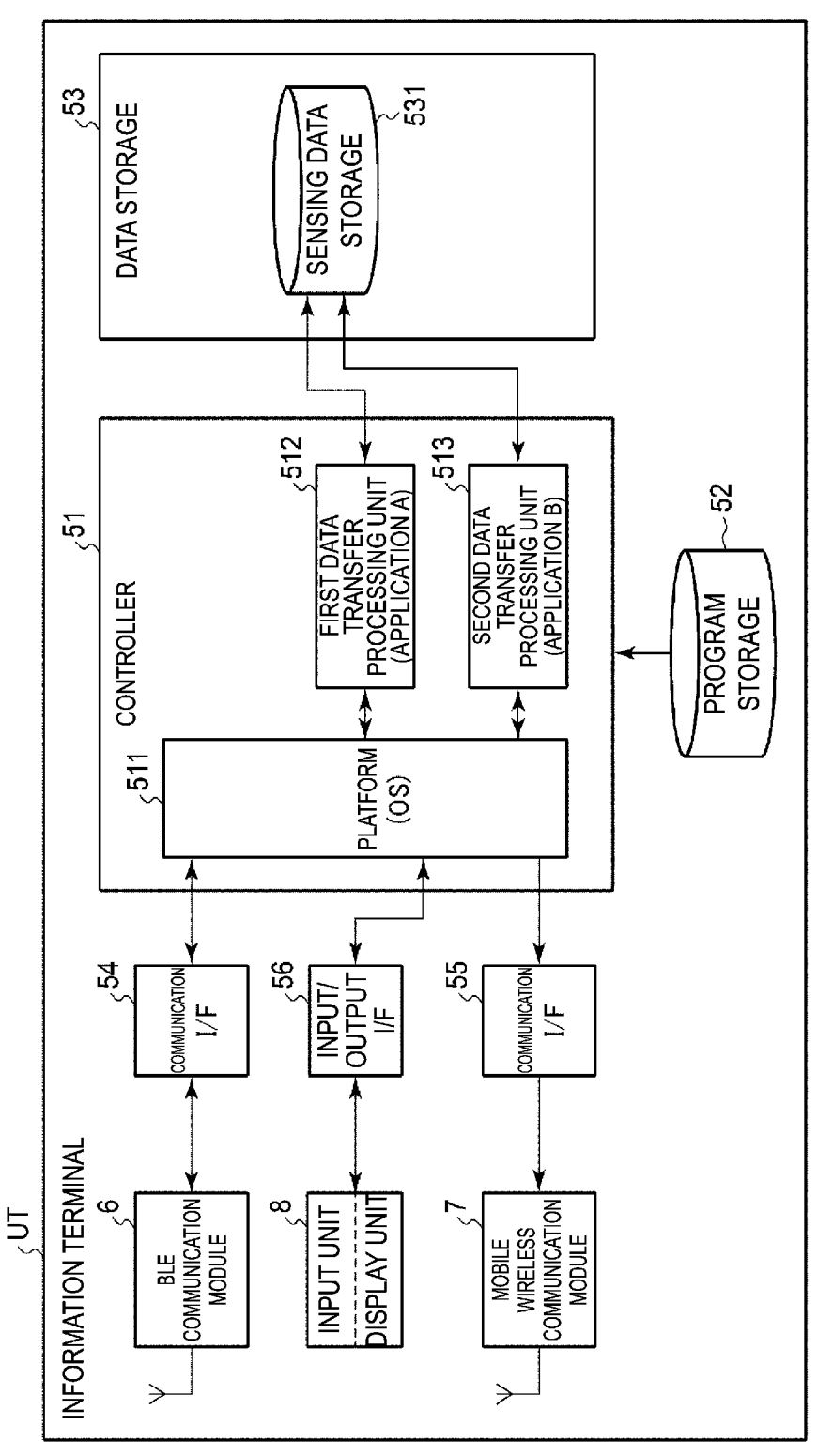
[FIG. 5]

[FIG. 6]
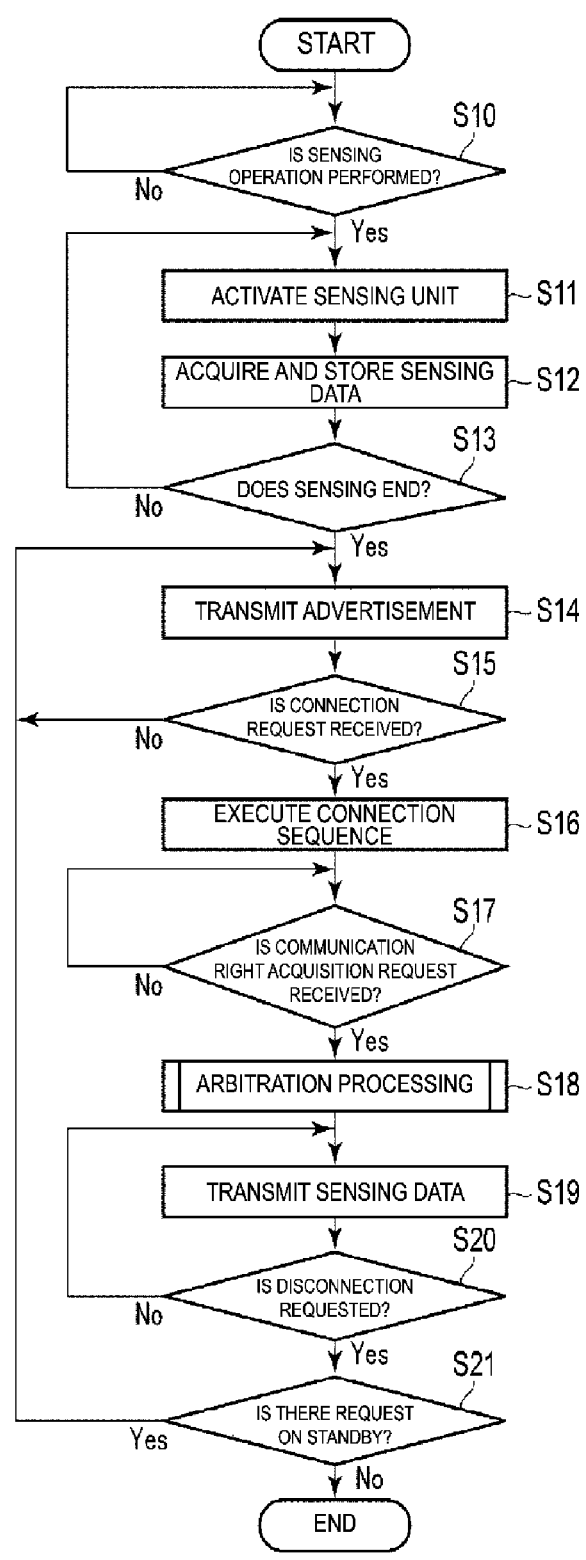

[FIG. 7]
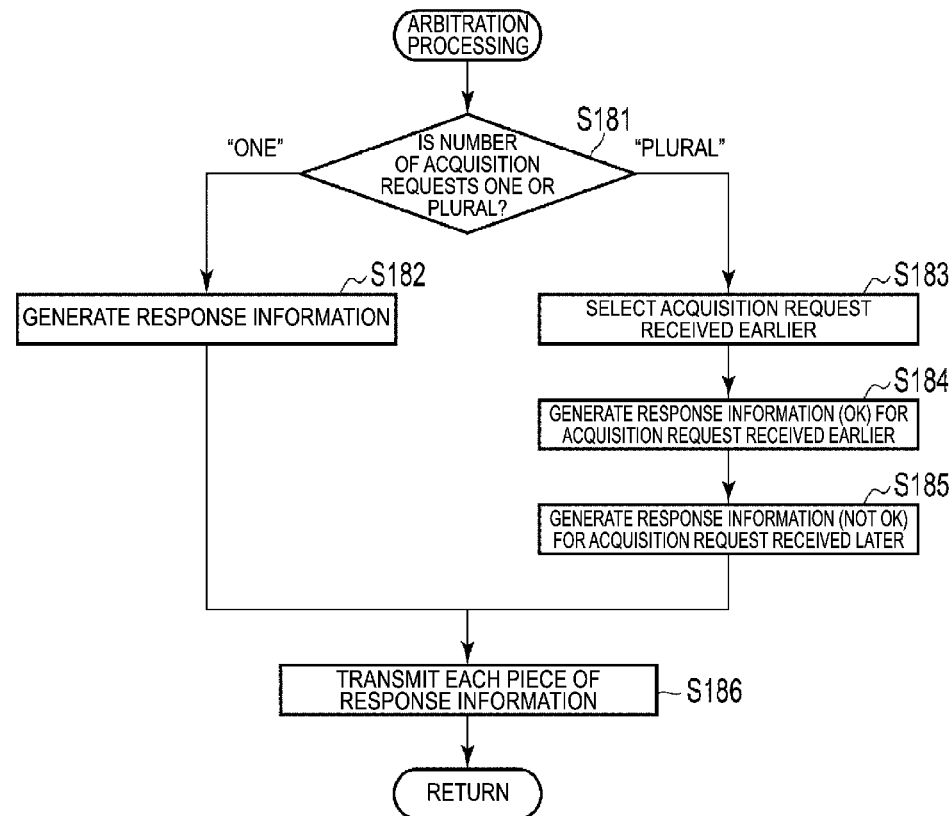

[FIG. 8]
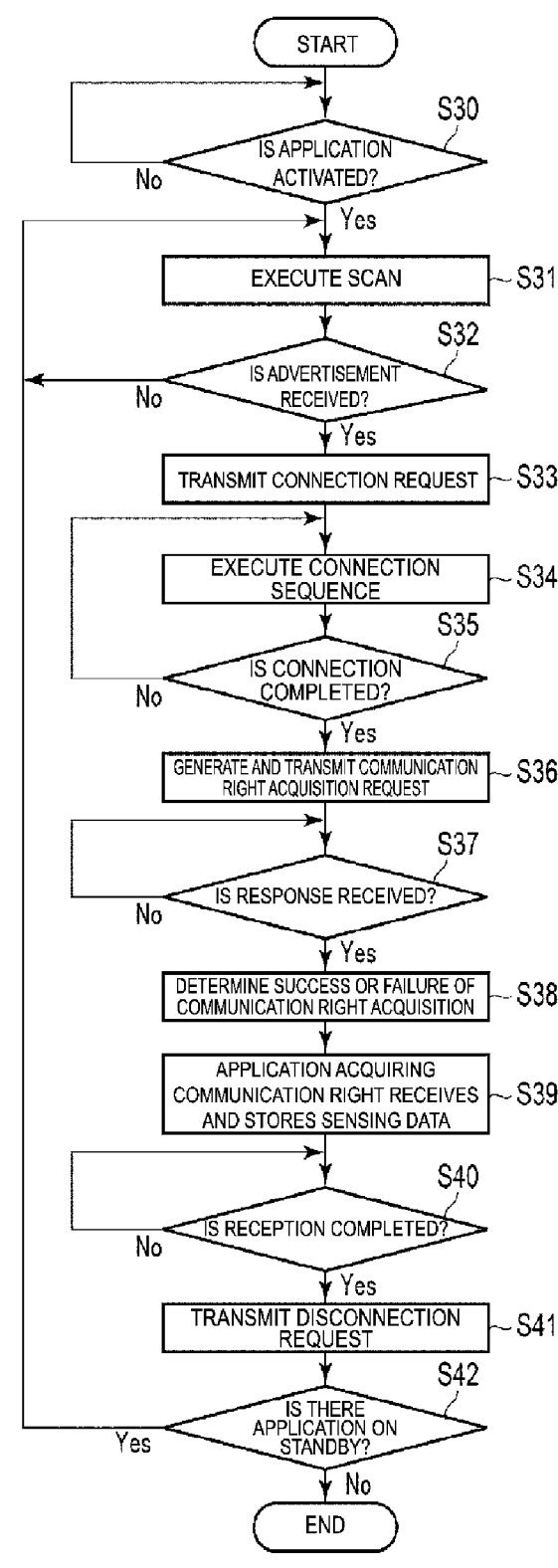

[FIG. 9A]
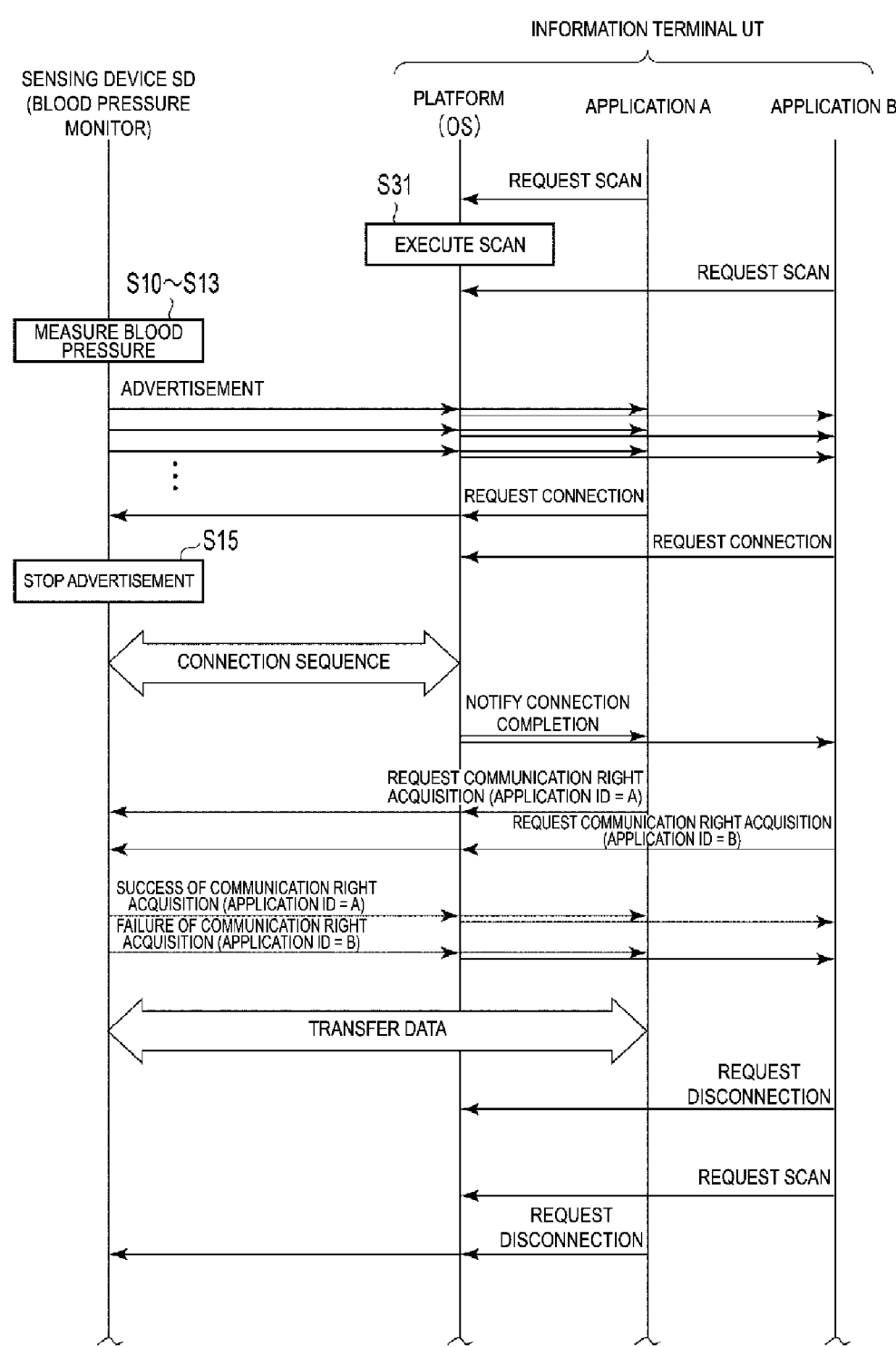

[FIG. 9B]
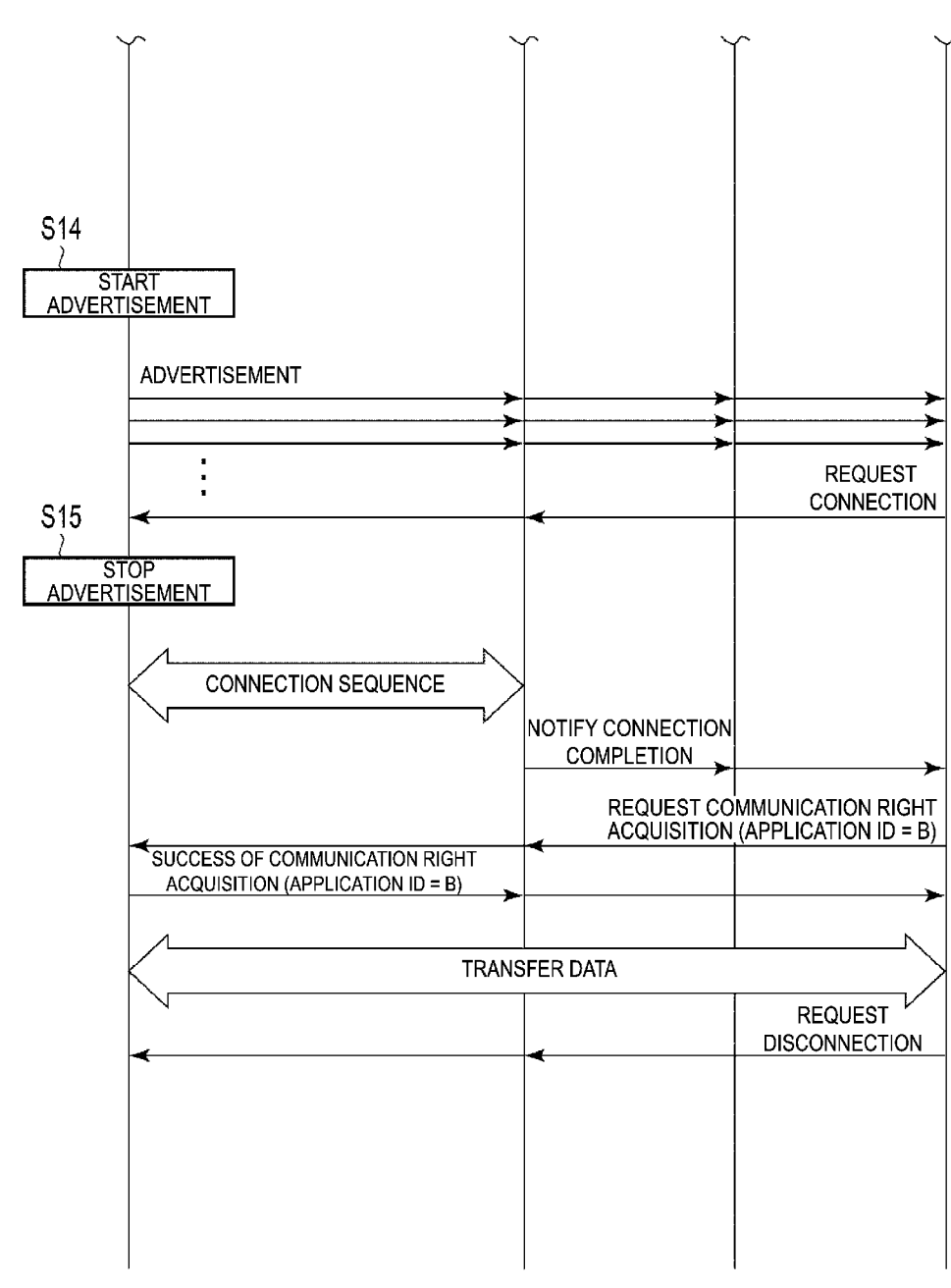

WIRELESS COMMUNICATION SYSTEM, WIRELESS COMMUNICATION METHOD, WIRELESS COMMUNICATION DEVICE, AND RECORDING MEDIUM

CROSS-REFERENCE TO RELATED APPLICATIONS

This application is the U.S. national stage application filed pursuant to 35 U.S.C. 365(c) and 120 as a continuation of International Patent Application No. PCT/JP2022/003730, filed Feb. 1, 2022, which application claims priority to Japanese Patent Application No. 2021-025101, filed Feb. 19, 2021, which applications are incorporated herein by reference in their entireties.

TECHNICAL FIELD

The present invention relates to a wireless communication system for transmitting data between a plurality of wireless communication devices, and a wireless communication method, a wireless communication device, and a program that are used in the system.

BACKGROUND ART

Examples of a known scheme for transferring sensing data measured by a sensing device such as a blood pressure monitor to a management device such as a server device include a scheme for transmitting sensing data from a sensing device to an information terminal such as a smart phone by using a near-field wireless communication technology such as Bluetooth (trade name), and transferring, by the information terminal, the sensing data to a management device such as a server via a mobile communication network (see, for example, Patent Document 1).

For example, an operating system (OS) of the information terminal transmits a communication right acquisition request generated by a data transfer application included in the information terminal to the sensing device, the OS receives a response returned from the sensing device and notifies the data transfer application of the response, and then the data transfer application executes receiving processing of the sensing data from the sensing device, so that this type of data transfer scheme is achieved.

CITATION LIST

Patent Literature

Patent Document 1: JP 2017-123144 A

SUMMARY OF INVENTION

Technical Problem

However, the related-art data transfer scheme has the following problem. That is, various services for performing health management of users have recently appeared, and cases have been increasing in which a user selects a desired service, transmits his/her own sensing data to a management server of the desired service, and requests health management. When using this service, the user installs a data transfer application provided by the service to be used in his/her own information terminal to enable transfer of the sensing data.

However, for example, when a plurality of data transfer applications are installed in the information terminal as in a case where the user selects a plurality of services, the following problem may occur. That is, when communication right acquisition requests are generated from the plurality of data transfer applications in the same period, these communication right acquisition requests are transmitted from the OS of the information terminal to a sensing device as they are, and respective responses returned from the sensing device are received by the OS of the information terminal and notified to the data transfer applications of request sources as they are. At this time, each data transfer application cannot determine whether the notified response is a response addressed to the data transfer application itself and thus attempts to execute processing for receiving the sensing data. Accordingly, communication conflict occurs in the sensing device. Thus, unintended data access may be executed on the sensing device, which may cause data corruption or the like.

The present invention is to provide a technology for suppressing communication conflict when a plurality of data transfer applications are installed in an information terminal.

Solution to Problem

A first aspect according to the present invention for solving the above problem relates to a wireless communication system including a first device that generates transmission target data and a second device including a plurality of applications, each of the plurality of applications performing data transfer processing, the second device performing transfer processing of the transmission target data with the first device under control of the plurality of applications. The first device includes a communication arbitration processing unit and a response processing unit. The second device includes a request transmission processing unit, a success/failure determination processing unit, and a data transfer processing unit.

The request transmission processing unit generates and transmits a communication right acquisition request including unique identification information of each of the plurality of applications when the corresponding one of the plurality of applications makes a request to the first device for communication. The communication arbitration processing unit determines, when a plurality of the communication right acquisition requests are received from the second device, permission or rejection of communication for each of the plurality of applications that are request sources based on the unique identification information included in the corresponding one of the plurality of the communication right acquisition requests and an arbitration condition set in advance. The response processing unit generates a response including information indicating a determination result of the permission or rejection and the unique identification information corresponding to the information and returns the response to the second device. The success/failure determination processing unit determines success or failure of acquisition of a communication right for each of the plurality of applications based on the information indicating the determination result of the permission or rejection and the unique identification information corresponding to the information that are included in the response returned from the first device. The data transfer processing unit executes the transfer processing of the transmission target data by an application having succeeded in acquiring the communication right among the plurality of applications based on a determination result of the success or failure.

According to the first aspect of the present invention, when the plurality of applications transmit the communication right acquisition requests in the second device, the first device determines permission or rejection of communication for each application that is the request source based on the application-specific identification information included in the corresponding one of the communication right acquisition requests and the arbitration condition and returns the response including the determination result and the application-specific identification information to the second device. On the other hand, the second device determines success or failure of acquisition of the communication right for each application based on the determination result of the permission or rejection of communication included in the response and executes the transfer processing of the transmission target data by an application having succeeded in acquiring the communication right.

Thus, for example, even when the plurality of applications transmit the communication right acquisition requests in the same period in the second device, the first device determines, based on the arbitration condition, permission or rejection of communication for each application that has transmitted the communication right acquisition request and returns the determination result. Thus, among the applications that are the request sources, only an application permitted to perform communication performs the transfer processing of the transmission target data in accordance with the contents of the response, thereby avoiding communication conflict in the first device. Thus, there is no concern that unintended data access is performed on the first device to cause data corruption or the like, which can enhance the reliability of the system.

A second aspect of the present invention relates to a wireless communication device used as a first device in a wireless communication system, the wireless communication system including the first device and a second device, the first device generating transmission target data, the second device including a plurality of applications, each of the plurality of applications performing data transfer processing, the second device performing transfer processing of the transmission target data with the first device under control of the plurality of applications. The wireless communication device includes a communication arbitration processing unit and a response processing unit. The communication arbitration processing unit determines, when a plurality of communication right acquisition requests are received from the second device, permission or rejection of communication for each of the plurality of applications that are request sources based on unique identification information of each of the plurality of applications included in the corresponding one of the plurality of communication right acquisition requests and an arbitration condition set in advance. The response processing unit generates a response including information indicating a determination result of the permission or rejection and the unique identification information corresponding to the information and returns the response to the second device.

According to the second aspect of the present invention, even when the plurality of applications of the second device transmit the communication right acquisition requests in the same period, the first device performs the arbitration processing on the plurality of communication right acquisition requests, and each application of the request source is notified of the result. Thus, in the second device, only an application permitted to perform communication executes the transfer processing of the transmission target data. Accordingly, communication conflict in the first device is avoided, and thus there is no concern about data corruption or the like due to unintended data access, and the first device can perform the data transfer processing with high stability.

In a third aspect of the present invention, the communication arbitration processing unit defines a first-come-first-served basis as the arbitration condition, and when the plurality of communication right acquisition requests are received from the second device, the communication arbitration processing unit permits communication for an application corresponding to a communication right acquisition request that is received earliest.

According to the third aspect of the present invention, when the communication right acquisition request is transmitted from each of the plurality of applications of the second device in the same period, communication for each application is permitted on the first-come-first-served basis. Thus, when the plurality of applications are installed in the second device, it is possible to fairly grant communication rights to these applications.

In a fourth aspect of the present invention, the communication arbitration processing unit defines priorities for the plurality of applications as the arbitration condition, and when the plurality of communication right acquisition requests are received from the second device, the communication arbitration processing unit permits communication for an application having a highest one of the priorities.

According to the fourth aspect of the present invention, when the communication right acquisition request is transmitted from each of the plurality of applications of the second device in the same period, communication for an application whose priority is set high is preferentially permitted. Thus, for example, the data transfer by an application having a high priority designated by the user can be preferentially performed.

In a fifth aspect of the device according to the present invention, the first device further includes a display processing unit, and the display processing unit generates display information for displaying the determination result of the permission or rejection and causes the display unit to display the display information.

According to the fifth aspect of the present invention, for example, the user can confirm which application of the second device performs the data transfer in the first device.

A sixth aspect of a device according to the present invention relates to a wireless communication device used as a second device in a wireless communication system, the wireless communication system including a first device and the second device, the first device generating transmission target data, the second device including a plurality of applications, each of the plurality of applications configured to perform data transfer processing, the second device performing transfer processing of the transmission target data with the first device under control of the plurality of applications, the first device including a function to determine, when a plurality of communication right acquisition requests are received from the second device, permission or rejection of communication for each of the plurality of applications that are request sources based on unique identification information of each of the plurality of applications included in the corresponding one of the plurality of communication right acquisition requests and an arbitration condition set in advance, generate a response including information indicating a determination result of the permission or rejection and the unique identification information corresponding to the information, and return the response to the second device. The wireless communication device includes a success/failure determination processing unit and a data transfer processing unit. The success/failure determination processing unit determines success or failure of acquisition of a communication right for each of the plurality of applications based on the information indicating the determination result of the permission or rejection and the unique identification information corresponding to the information that are included in the response returned from the first device in response to transmission of the corresponding one of the plurality of communication right acquisition requests. The data transfer processing unit executes the transfer processing of the transmission target data by an application having succeeded in acquiring the communication right among the plurality of applications based on a determination result of the success or failure.

According to the sixth aspect of the present invention, each application of the second device determines success or failure of acquisition of the communication right based on the contents of the response returned from the first device in response to the communication right acquisition request, and the data transfer processing is executed by only an application having succeeded in acquiring the communication right. Accordingly, communication conflict in the first device is avoided, and thus there is no concern about data corruption or the like, which enables the data transfer processing with high stability.

In a seventh aspect of the present invention, the second device further includes a display processing unit, and the display processing unit generates display information indicating the determination result of the success or failure and causes the display unit to display the display information.

According to the seventh aspect of the present invention, the user can confirm which application of the plurality of applications is selected in the second device.

Advantageous Effects of Invention

That is, according to the present invention, it is possible to provide a technology for suppressing communication conflict when a plurality of data transfer applications are installed in an information terminal.

BRIEF DESCRIPTION OF DRAWINGS

Various embodiments are disclosed, by way of example only, with reference to the accompanying schematic drawings in which corresponding reference symbols indicate corresponding parts, in which:

FIG. 1 is a diagram illustrating an overall configuration of a wireless communication system according to an embodiment of the present invention;

FIG. 2 is a block diagram illustrating a hardware configuration of a sensing device used as a first device in the system illustrated in FIG. 1;

FIG. 3 is a block diagram illustrating a software configuration of the sensing device used as the first device in the system illustrated in FIG. 1;

FIG. 4 is a block diagram illustrating a hardware configuration of an information terminal used as a second device in the system illustrated in FIG. 1;

FIG. 5 is a block diagram illustrating a software configuration of the information terminal used as the second device in the system illustrated in FIG. 1;

FIG. 6 is a flowchart illustrating a processing procedure and processing details of sensing data transmission processing executed by a controller of the sensing device illustrated in FIG. 3;

FIG. 7 is a flowchart illustrating a processing procedure and processing details of arbitration processing of the processing procedure illustrated in FIG. 6;

FIG. 8 is a flowchart illustrating a processing procedure and processing details of sensing data reception processing executed by a controller of the information terminal illustrated in FIG. 5;

FIG. 9A is a sequence diagram illustrating a procedure of a first half of data transfer processing executed between the sensing device and the information terminal illustrated in FIG. 3 and FIG. 5, respectively; and, FIG. 9B is a sequence diagram illustrating a procedure of a latter half of the data transfer processing executed between the sensing device and the information terminal illustrated in FIG. 3 and FIG. 5, respectively.

DESCRIPTION OF EMBODIMENTS

Now, with reference to the drawings, an embodiment of the present invention is described.

Embodiment; Configuration Example (1); System

FIG. 1 is a diagram illustrating an overall configuration of a wireless communication system according to an embodiment of the present invention.

The wireless communication system according to an embodiment includes a sensing device SD functioning as a first device and an information terminal UT functioning as a second device. Then, sensing data measured by the sensing device SD is transferred to the information terminal UT through, for example, Bluetooth (trade name), which is one of the near-field wireless communication technologies. The information terminal UT transfers the sensing data to a server device SV via a network NW.

In this example, Bluetooth Low Energy (BLE) defined by version 4.0 of Bluetooth is used as a wireless communication scheme between the sensing device SD and the information terminal UT. Use of BLE can further reduce power consumption as compared with the previous specification, and in particular, use of one way communication called BLE advertising can be expected to achieve further power consumption reduction.

The network NW includes, for example, the Internet and an access network for accessing the Internet. Examples of the access network include a mobile wireless communication network adopting the 4G or 5G standard and a wireless local area network (LAN), but the access network is not limited thereto.

The server device SV includes a cloud computer or a web computer operated by, for example, a medical health organization or a health information service provider and collects sensing data of users to perform health management of the users. Although FIG. 1 illustrates only one server device SV for the sake of simplicity, when there are a plurality of service providers performing health management of the users, there are a plurality of server devices operated by the respective service providers.

(2) Device; (2-1) Sensing Device SD

FIG. 2 and FIG. 3 are block diagrams illustrating a hardware configuration and a software configuration of the sensing device SD, respectively.

The sensing device SD is constituted by, for example, a blood pressure monitor and includes a control unit 1, a sensing unit 2, a BLE communication module 3, an input unit 4a, and a display unit 4b.

The sensing unit 2 performs a measurement operation of sensing data including, for example, blood pressure data under control of the control unit 1 and outputs the measured sensing data to the control unit 1. The sensing unit 2 may be a device that measures, in addition to the blood pressure data, other vital data related to a pulse rate, an electrocardiographic waveform, a blood sugar level, an amount of activity, a stress level, and the like alone or in combination.

The BLE communication module 3 transmits and receives a wireless control signal and data to and from the information terminal UT in accordance with a communication protocol defined by the BLE standard. The BLE communication module 3 is not limited to one incorporated in the sensing device SD and may be one externally provided as an attachment communication adapter or a communication module included in an IoT device, a router, or a set top box (STB), which is independently used.

The control unit 1 includes a controller 11 including a hardware processor such as a central processing unit (CPU). The controller 11 may include a digital signal processor (DSP) for performing encryption processing and the like.

A storage unit including a program storage 12 and a data storage 13, a sensor interface (hereinafter an interface is referred to as an "I/F") 14, a communication I/F and an input/output I/F 16 are connected to the controller 11 via a bus 17.

Under control of the controller 11, the sensor I/F 14 performs processing of transmitting and receiving various control signals related to operations of the sensing unit 2, receiving sensing data output from the sensing unit 2, and passing the sensing data to the controller 11. Under control of the controller 11, the communication I/F 15 transmits and receives various control signals related to operations of the BLE communication module 3 and performs processing of outputting a packet generated by the controller 11 to the BLE communication module 3.

The program storage 12 is configured by combining, for example, a non-volatile memory on which writing and reading can be performed as needed such as a hard disk drive (HDD) or a solid state drive (SSD) and a non-volatile memory such as a read only memory (ROM) as a storage medium and stores programs used for executing various kinds of control processing according to an embodiment, in addition to middleware such as an operating system (OS).

The data storage 13 is a combination of, for example, a non-volatile memory on which writing and reading can be performed as needed such as an SSD and a volatile memory such as a random access memory (RAM) as a storage medium and includes a sensing data storage 131 and an arbitration information storage 132 as main storages used for implementing an embodiment.

The sensing data storage 131 is used to store sensing data measured by the sensing unit 2 in association with information indicating its measurement date and time of the sensing data or the like.

The arbitration information storage 132 stores an arbitration condition for performing arbitration of communication for a plurality of communication right acquisition requests when these requests are transmitted from the information terminal UT in a process of connecting a BLE wireless link. In this example, a "first-come-first-served basis" or a "priority" is defined as the arbitration condition, but the arbitration condition is not limited thereto. The arbitration information storage 132 also stores information indicating arbitration results of the plurality of communication right acquisition requests.

The data storage 13 also includes a storage area for temporarily storing data generated in processes of various types of processing of the controller 11.

The controller 11 includes a sensing controller 111, a BLE communication controller 112, a communication arbitration processing unit 113, and a sensing data transmission processing unit 114 as main functions used for implementing an embodiment. Each of these controllers and processing units 111 to 114 is implemented by causing the hardware processor of the controller 11 to execute a program stored in the program storage 12.

The sensing controller 111 activates the sensing unit 2 via the sensor I/F 14 when the input unit 4a is subjected to an operation serving as a trigger for a measurement operation of vital data including blood pressure data. Then, processing is performed in which sensing data measured by the sensing unit 2 is acquired via the sensor I/F 14, and the acquired sensing data is stored in the sensing data storage 131 in association with information indicating a measurement date and time.

The BLE communication controller 112 executes advertising and a connection sequence of BLE with the information terminal UT in accordance with a communication protocol defined in the BLE communication scheme to execute a series of processing operations of establishing a BLE wireless link with the information terminal UT.

When a plurality of communication right acquisition requests by a plurality of data transfer applications described below are transmitted from the information terminal UT in a process of the above BLE advertising, the communication arbitration processing unit 113 performs, based on the arbitration condition stored in the arbitration information storage 132, arbitration of communication for the respective applications that have transmitted the plurality of communication right acquisition requests. Then, the communication arbitration processing unit 113 performs processing of generating response information including information indicating an arbitration result and unique identification information (hereinafter referred to as an application ID) of the data transfer application that is the request source included in each communication right acquisition request and causing the BLE communication controller 112 to return the generated response information. In addition, the communication arbitration processing unit 113 causes the arbitration information storage 132 to store the information indicating the arbitration result.

In a state where the BLE wireless link to the information terminal UT is established by the BLE communication controller 112, the sensing data transmission processing unit 114 performs processing of reading untransmitted sensing data from the sensing data storage 131, outputting the sensing data to the BLE communication module 3 via the communication OF 15, and causing the BLE communication module 3 to transmit the sensing data.

(2-2) Information Terminal UT

FIG. 4 and FIG. 5 are block diagrams illustrating a hardware configuration and a software configuration of the information terminal UT, respectively.

The information terminal UT is, for example, a smart phone owned by the user. As the information terminal UT, a tablet terminal, a wearable terminal, a laptop personal computer, or the like may be also used as long as it is owned by the user.

The information terminal UT includes a control unit 5, a BLE communication module 6, a mobile wireless communication module 7, and an input/output device 8.

The BLE communication module 6 transmits and receives a wireless control signal and data to and from the sensing device SD in accordance with a communication protocol defined by the BLE standard.

The mobile wireless communication module 7 transmits and receives data to and from the server device SV via the network NW by using a wireless access scheme and a communication protocol defined in a mobile communication network. Examples of the wireless access scheme used include Long Term Evolution (LTE) (trade name), 4G, or 5G.

The input/output device 8 is configured by disposing a touch-type input sheet adopting a pressure sensitive type or an electrostatic capacitive type on a display screen of a display device made of liquid crystal or organic EL and is used to receive various types of operation data and display data.

The control unit 5 includes a controller 51 including a hardware processor such as a central processing unit. A storage unit including a program storage 52 and a data storage 53, communication I/Fs 54 and 55, and an input/output OF 56 are connected to the controller 51 via a bus 57.

The communication OF 54 performs processing such as relay or conversion of various signals transmitted and received between the controller 51 and the BLE communication module 6 in a process of establishing a BLE wireless link with the sensing device SD.

The input/output OF 56 receives operation data input to the input/output device 8, passes the data to the controller 51, outputs various types of display information output from the controller 51 to the input/output device 8, and causes the input/output device 8 to display the information.

The program storage 52 is configured by combining, for example, a non-volatile memory on which writing and reading can be performed as needed such as an SSD and a non-volatile memory such as a ROM as a storage medium and stores programs used for executing various kinds of control processing according to an embodiment, in addition to middleware such as an OS.

The program includes a plurality of data transfer applications provided by a plurality of providers (which may include a manufacturer of the sensing device SD or the like) that provide health management services. In this example, it is assumed that two data transfer applications (hereinafter referred to as an application A and an application B) are installed.

The data storage 53 is a combination of, for example, a non-volatile memory on which writing and reading can be performed as needed such as an SSD and a volatile memory such as a RAM as a storage medium and includes a sensing data storage 531 as a main storage used for implementing an embodiment. The sensing data storage 531 is used to store sensing data transmitted from the sensing device SD. The sensing data storage 531 may be provided for each of the application A and the application B. The data storage 53 also includes a storage area for temporarily storing data generated in processes of various types of processing of the controller 51.

The controller 51 includes a platform 511, a first data transfer processing unit 512, and a second data transfer processing unit 513. Each of these processing units 511 to

513 is implemented by causing the hardware processor of the controller 51 to execute an OS and an application program stored in the program storage 52.

The platform 511 is executed by the OS and executes, in accordance with a communication protocol defined by the BLE communication scheme, scanning for the sensing device SD, receiving a BLE advertisement from the sensing device SD, and transmission and reception processing of various requests and responses related to a BLE connection sequence to perform a series of processing operations until a BLE wireless link is established with the sensing device SD.

The first data transfer processing unit 512 operates by executing the application A and performs a series of data transfer processing operations for acquiring sensing data from the sensing device SD.

For example, the first data transfer processing unit 512 causes the platform 511 to execute scanning, receive an advertisement, transmit a connection request, execute a connection sequence, transmit a communication right acquisition request, and receive response information to the request. At this time, the application ID of the application A is inserted into the connection request.

Next, the first data transfer processing unit 512 determines success or failure of communication right acquisition for the application A based on an arbitration result and the application ID included in the received response information. If the communication right acquisition has succeeded, the first data transfer processing unit 512 receives the sensing data via the wireless link established with respect to the sensing device SD and causes the sensing data storage 531 to store the received sensing data.

The first data transfer processing unit 512 also monitors a transfer timing of the stored sensing data to the server device SV, reads, when the transfer timing arrives, untransmitted sensing data from the sensing data storage 531, and outputs the read sensing data to the mobile wireless communication module 7 via the communication OF 55. Then, the first data transfer processing unit 512 causes the mobile wireless communication module 7 to transmit the sensing data to the server device SV via the network NW in accordance with a communication protocol defined in the mobile communication network.

The second data transfer processing unit 513 operates by executing the application B and performs a series of data transfer processing operations for acquiring sensing data from the sensing device SD.

The processing procedure and the processing details thereof are the same as those of the processing of the first data transfer processing unit 512 executing the application A.

Operation Example

Next, an example of an operation of the wireless communication system configured as described above will be described.

FIG. 6 and FIG. 7 are flowcharts illustrating processing procedures and processing details by the controller 11 of the sensing device SD, and FIG. 8 is a flowchart illustrating a processing procedure and processing details by the controller 51 of the information terminal UT. FIG. 9A and FIG. 9B are sequence diagrams illustrating an operation procedure of the data transfer processing between the sensing device SD and the information terminal UT.

(1) Activation of Data Transfer Application in Information Terminal UT

In step S30 illustrated in FIG. 8, the controller 51 of the information terminal UT monitors activation of each application. In this state, for example, when the user performs activation operations of the application A and the application B with the input/output device 8 or when activation requests of the applications A and B are received from the server device SV of the service provider, the controller 51 of the information terminal UT activates the applications A and B.

Thereafter, the applications A and B operate in the background with respect to other various applications installed in the information terminal UT.

When each of the data transfer processing units 512 and 513 executing the applications A and B, respectively, is activated, a scan request is first given to the platform 511 in step S31. As a result, thereafter, the platform 511 starts an operation of intermittently scanning a BLE advertisement for the sensing device SD. At this time, the platform 511 receives the scan requests from both the applications A and B but executes a scan operation in response to a scan request received earlier as illustrated in FIG. 9A.

(2) Sensing Operation in Sensing Device SD

It is assumed that the user, who is a subject, performs an operation for sensing with the sensing device SD. The operation at this time may be, for example, pressing of a measurement button provided at the input unit 4a but may also be an operation in which the user wears a cuff at a target measurement site such as an arm or a wrist.

If detecting the operation in step S10, the controller 11 of the sensing device SD activates the sensing unit 2 in step S11 under control of the sensing controller 111. Then, the controller 11 acquires sensing data measured and output by the sensing unit 2 via the sensor I/F 14 in step S12 and causes the sensing data storage 131 to store the acquired sensing data after information indicating a measurement date and time is added thereto. When the above one sensing operation ends, the sensing controller 111 determines whether the sensing operation has ended in step S13. If the subject presses the measurement button again, the processing returns to step S11, and the sensing operation repeats.

In this example, data indicating a systolic blood pressure, a diastolic blood pressure, and a pulse rate is acquired as the sensing data. However, the sensing data may include other vital data related to a pulse rate, an electrocardiographic waveform, a blood sugar level, an amount of activity, a stress level, and the like alone or in combination.

(3) Transfer of Sensing Data; (3-1) Execution of Advertising and Connection Sequence of BLE If determining that the sensing operation has ended in step S13 described above, the controller 11 of the sensing device SD starts transmission of a BLE advertisement intermittently at, for example, fixed time intervals in step S14 under control of the BLE communication controller 112.

On the other hand, if the controller 51 of the information terminal UT receives the BLE advertisement by the platform 511 in step S32, each of the first data transfer processing unit 512 and the second data transfer processing unit 513 generates a connection request and outputs the connection request to the platform 511 in step S33.

The platform 511 outputs the connection request to the BLE communication module 6 via the communication OF 54. As a result, the connection request is transmitted from the BLE communication module 6 to the sensing device SD. At this time, when the connection request is generated from each of the first data transfer processing unit 512 and the second data transfer processing unit 513, the platform 511 transmits only a connection request generated earlier to the sensing device SD.

If receiving the connection request from the information terminal UT in step S15 during the transmission period of the advertisement, the controller 11 of the sensing device SD executes a BLE connection sequence in step S16 under control of the BLE communication controller 112.

At this time, the platform 511 of the information terminal UT also executes a BLE connection sequence with the sensing device SD in step S34 after transmitting the connection request. Then, when connected to the sensing device SD through the BLE connection sequence, the platform 511 notifies the first data transfer processing unit 512 and the second data transfer processing unit 513, which are transmission sources of the connection requests, of connection completion.

(3-2) Transmission of Communication Right Acquisition Request

If the connection completion notifications are received in step S35, the first data transfer processing unit 512 and the second data transfer processing unit 513 generate communication right acquisition requests in step S36. At this time, the application IDs of the applications A and B that are the request sources are inserted into the respective communication right acquisition requests.

Then, the first data transfer processing unit 512 and the second data transfer processing unit 513 pass the generated communication right acquisition requests to the platform 511. The platform 511 transmits each communication right acquisition request from the BLE communication module 6 to the sensing device SD.

(3-3) Communication Arbitration Processing

On the other hand, when the controller 11 of the sensing device SD receives each communication right acquisition request in step S17, the processing proceeds to step S18. Then, under control of the communication arbitration processing unit 113, the controller 11 executes the arbitration processing of communication for the communication right acquisition requests as follows.

FIG. 7 is a flowchart illustrating a processing procedure and processing details of the arbitration processing of this communication. That is, in step S181, the communication arbitration processing unit 113 first determines whether the number of communication right acquisition requests transmitted from the information terminal UT within a fixed time (for example, one second or less) is one or plural. If the number is one as a result of this determination, the communication arbitration processing unit 113 unconditionally permits communication for this request. Then, in step S182, the communication arbitration processing unit 113 generates response information including information indicating that the communication is permitted and the application ID included in the received communication right acquisition request and causes the BLE communication module 3 to transmit the generated response information to the information terminal UT in step S186.

On the other hand, it is assumed that two communication right acquisition requests are received from the information terminal UT within the fixed time as described above. In this case, the communication arbitration processing unit 113 reads the arbitration condition from the arbitration information storage 132. Then, the communication arbitration processing unit 113 determines permission or rejection of communication for each of the two communication right acquisition requests based on the read arbitration condition.

For example, two methods of a "first-come-first-served basis" and a "priority order" can be considered as a method of determining permission or rejection of communication. These are defined by the arbitration condition.

First, in the case of the "first-come-first-served basis", communication for a communication right acquisition request received earlier is permitted, and communication for a communication right acquisition request received later is rejected. In this case, the communication arbitration processing unit 113 selects the communication right acquisition request received earlier in step S183 as illustrated in FIG. 7 and generates, for the selected communication right acquisition request, response information in which flag information indicating permission (OK) of communication and an application ID are inserted in step S184. On the other hand, for the communication right acquisition request received later, the communication arbitration processing unit 113 generates response information in which flag information indicating rejection (not OK) of communication and the application ID are inserted are generated in step S185. Then, the communication arbitration processing unit 113 transmits each generated response information from the BLE communication module 3 to the information terminal UT in step S186.

On the other hand, in the case of the "priority order", for example, determination is made in accordance with priorities that the user sets in advance on the applications A and B in the information terminal UT. Communication for a communication right acquisition request corresponding to an application having a higher priority is permitted, and communication for a communication right acquisition request corresponding to an application having a lower priority is temporarily rejected. Whether the transmission source of the communication right acquisition request is the application A or the application B is determined based on the application ID included in the communication right acquisition request.

In this case as well, the communication arbitration processing unit 113 generates response information including flag information indicating a determination result of the above permission or rejection, that is, permission (OK) or rejection (not OK), and the application ID of the application that is the request source for each communication right acquisition request and transmits the generated response information from the BLE communication module 3 to the information terminal UT.

When receiving the respective pieces of response information transmitted from the sensing device SD via the BLE communication module 6, the platform 511 of the information terminal UT passes the respective pieces of received response information to the first data transfer processing unit 512 and the second data transfer processing unit 513. In this case, the platform 511 does not have a function of identifying the destinations of the respective pieces of response information and thus notifies both the first data transfer processing unit 512 and the second data transfer processing unit 513 of the respective pieces of received response information.

When receiving the respective pieces of response information, each of the first data transfer processing unit 512 and the second data transfer processing unit 513 of the information terminal UT determines which response information is addressed to its own application based on the application IDs included in the respective pieces of response information in step S38. Then, each of the first data transfer processing unit 512 and the second data transfer processing unit 513 determines success or failure of the communication right acquisition based on the flag information included in the response information addressed to its own application. Thereafter, the reception operation of the sensing data is executed by the first data transfer processing unit 512 or the second data transfer processing unit 513 that has succeeded in acquiring the communication right.

(3-4) Transfer of Sensing Data

When the arbitration processing ends, the controller 11 of the sensing device SD reads the sensing data from the sensing data storage 131 in step S19 under control of the sensing data transmission processing unit 114. Then, the controller 11 transfers the read sensing data from the BLE communication module 3 to the information terminal UT via the wireless link established with the information terminal UT.

On the other hand, a data transfer processing unit among the first and second data transfer processing units 512 and 513 of the information terminal UT that has succeeded in acquiring the communication right, for example, the first data transfer processing unit 512 corresponding to the application A receives the sensing data from the sensing device SD via the BLE wireless link established with the sensing device SD and causes the sensing data storage 531 to store the received sensing data. If completion of the sensing data reception has been detected in step S40, the first data transfer processing unit 512 transmits a disconnection request to the sensing device SD in step S41 and ends the processing.

(3-5) Case where there is Application on Standby for Communication

The controller 11 of the sensing device SD stores the information indicating the determination result of permission or rejection of communication by the communication arbitration processing unit 113, for example, the communication right acquisition request the communication of which has been rejected in the arbitration information storage 132 as the communication standby information. If receiving the disconnection request transmitted from the information terminal UT in step S20 after transmission of the sensing data, the BLE communication controller 112 then determines, based on the communication standby information stored in the arbitration information storage 132, whether there is a communication right acquisition request on standby in step S21. Then, if there is the communication right acquisition request on standby, the processing returns to step S14, and the processing is executed again from step S14 to step S20.

On the other hand, when the first data transfer processing unit 512 transmits the disconnection request and ends the data transfer processing in step S41, the controller 51 of the information terminal UT subsequently determines in step S42 whether there is a data transfer application on standby. As a result of this determination, when there is the data transfer application on standby, the controller 51 of the information terminal UT returns the processing to step S31 and executes the processing from step S31 to step S41 again.

For example, in the example described above, because the application B is on standby for communication, processing of receiving the sensing data from the sensing device SD is executed under control of the second data transfer processing unit 513 in steps S31 to S41 described above. FIG. 9B illustrates the processing sequence.

Actions and Effects

As described above, in an embodiment, when the sensing data is transferred from the sensing device SD to the information terminal UT under control of each of the two data transfer applications A and B installed in the information terminal UT, the applications A and B transmit the communication right acquisition requests including their respective application IDs to the sensing device SD. On the other hand, when the sensing device SD receives the communication right acquisition request by each of the applications A and B from the information terminal UT, the sensing device SD determines permission or rejection of communication for each of the applications A and B based on the arbitration condition stored in advance. Then, the sensing device SD generates the response information including the information indicating the determination result and the application ID included in the communication right acquisition request and returns the response information to the information terminal UT. Each of the applications A and B of the information terminal UT determines success or failure of acquisition of a communication right based on the received response information, and the application A or B that has succeeded in acquiring the communication right performs processing of receiving the sensing data from the sensing device SD.

Thus, for example, even when the applications A and B of the information terminal UT transmit the communication right acquisition requests in the same period, the sensing device SD performs the arbitration processing for each communication right acquisition request, and the information terminal UT is notified of the result through the response information. For this reason, only one of the applications A and B of the request sources that has succeeded in acquiring the communication right performs the transfer processing of the sensing data, and the communication conflict in the sensing device SD is avoided. Thus, there is no concern that unintended data access is performed on the sensing device SD to cause data corruption or the like. And this can improve reliability of the data transfer processing.

In an embodiment, the first-come-first-served basis is defined as the arbitration condition, and communication is permitted for the communication right acquisition request received earliest. Thus, it is possible to fairly grant the respective communication rights to the applications A and B installed in the information terminal UT.

On the other hand, priorities may be defined for the applications A and B as the arbitration condition. In this case, for example, data transfer by an application having a high priority designated by the user can be preferentially performed.

Furthermore, in an embodiment, the sensing device SD stores, as the arbitration information which is information indicating the arbitration result, the communication right acquisition request from the application B the communication of which has been rejected, and the information terminal UT stores information indicating the determination result of success or failure of the communication right acquisition. Then, after the end of the data transfer by the application A the communication of which has been permitted, the BLE advertising and the connection sequence are continuously performed based on the respective pieces of stored information, and the data transfer processing by the application B is further executed. Thus, after the end of the data transfer processing by the application A, the data transfer processing by the application B is automatically executed, and the data transfer processing by all the running applications can be completed.

Modified Examples

The sensing device SD may generate display information indicating the arbitration result of each communication right acquisition request and display the information on the display unit 4b. Furthermore, the information terminal UT may generate display information indicating success or failure of communication right acquisition and display the information on the display unit of the input/output device 8. In this way, the user can confirm the application during the sensing data transfer processing in both the sensing device SD and the information terminal UT.

The example above describes a case where the information terminal UT transmits a disconnection request when one of the applications A and B has ended data transfer. However, as another example, it is possible for the information terminal UT to cause an application on standby to perform the communication processing without transmitting the disconnection request by the following communication processing.

That is, for example, it is assumed that the applications A and B transmit respective communication right acquisition requests and that the sensing device SD returns a communication right acquisition response (OK) to the application A and a communication right acquisition response (not OK) to the application B. In this case, in the information terminal UT, the application A executes data transfer, and the application B enters a standby state. When the application A completes the data transfer, the information terminal UT transmits a communication right release request. At this time, the ID of the application A is inserted into the communication right release request.

On the other hand, when receiving the communication right release request in which the ID of the application A is inserted, the sensing device SD returns a communication right release response including the ID of the application A. When confirming that the application A has released the communication right based on the communication right release response including the ID of the application A, the information terminal UT transmits a communication right acquisition request to the sensing device SD again. Through such a processing procedure, both the applications A and B can also complete the respective data transfers.

Other Embodiments

In an embodiment, although an example has been described in which a blood pressure monitor is used as the first device, the first device may be a device that measures vital data other than blood pressure data. Moreover, the first device may be a device that measures environmental data such as a temperature, humidity, and atmospheric pressure in addition to the vital data or may be a device that measures a substance related to air pollution such as exhaust gas, water quality, vibration, noise, or the like.

In addition, the number of the data transfer applications, the types and configurations of the first device and the second device, the processing procedure and processing details, the type and data structure of the transmission target data, and the like can be variously modified without departing from the scope of the present invention.

While the embodiment of the present invention has been described in detail above, the foregoing description is a mere example of the present invention in all respects. It goes without saying that various modifications and variations can be made without departing from the scope of the present invention. Thus, specific configurations in accordance with an embodiment may be adopted as appropriate at the time of carrying out the present invention.

In short, the present invention is not limited to the embodiments described above and can be embodied by modifying the constituent element in an implementation stage in a range without departing from the gist thereof. Additionally, various inventions can be formed by appropriately combining a plurality of constituent elements disclosed in the embodiments described above. For example, some constituent elements may be omitted from all the constituent elements described in the embodiments. Furthermore, the constituent elements of the different embodiments may be combined appropriately.

REFERENCE NUMERALS LIST

SD Sensing device
UT Information terminal
NW Network
SV Server device
1, 5 Control unit
2 Sensing unit
3, 6 BLE communication module
4a Input unit
4b Display unit
7 Mobile wireless communication module
8 Input/output device
11, 51 Controller
12, 52 Program storage
13, 53 Data storage
14 Sensor OF
54, 55 Communication OF
16, 56 Input/output OF
111 Sensing controller
112 BLE communication controller
113 Communication arbitration processing unit
114 Sensing data transmission processing unit
131, 531 Sensing data storage
132 Arbitration information storage
511 Platform (OS)
512 First data transfer processing unit (application A)
513 Second data transfer processing unit (application B)
514 Sensing data transfer processing unit

What is claimed is:

1. A wireless communication system comprising:
a first device configured to generate transmission target data; and,
a second device including a plurality of applications, each of the plurality of applications configured to perform data transfer processing, the second device configured to perform transfer processing of the transmission target data with the first device under control of the plurality of applications,
wherein the second device includes a second device processor configured to:
generate and transmit a communication right acquisition request including unique identification information of each of the plurality of applications when the corresponding one of the plurality of applications makes a request to the first device for communication,
the first device includes a first device processor configured to:
determine, when a plurality of the communication right acquisition requests are received from the second device, permission or rejection of communication for each of the plurality of applications that are request sources based on the unique identification information included in the corresponding one of the plurality of the communication right acquisition requests and an arbitration condition set in advance; and,
generate a response including information indicating a determination result of the permission or rejection and the unique identification information corresponding to the information and return the response to the second device;
wherein the first device processor is configured to store information indicating that the communication right acquisition request has been rejected as communication standby information, and,
the second device processor is further configured to:
determine success or failure of acquisition of a communication right for each of the plurality of applications based on the information indicating the determination result of the permission or rejection and the unique identification information corresponding to the information that are included in the response returned from the first device; and,
execute the transfer processing of the transmission target data by an application having succeeded in acquiring the communication right among the plurality of applications based on a determination result of the success or failure,
wherein the second device processor is further configured to determine whether there is a communication right acquisition request on standby, and to execute the transfer processing of the transmission target data by an application being on standby for communication.

2. A wireless communication device used as a first device in a wireless communication system, the wireless communication system including the first device and a second device, the first device configured to generate transmission target data, the second device including a plurality of applications, each of the plurality of applications configured to perform data transfer processing, the second device configured to perform transfer processing of the transmission target data with the first device under control of the plurality of applications, the wireless communication device comprising:
a processor configured to:
determine, when a plurality of communication right acquisition requests are received from the second device, permission or rejection of communication for each of the plurality of applications that are request sources based on unique identification information of each of the plurality of applications included in the corresponding one of the plurality of communication right acquisition requests and an arbitration condition set in advance; and,
generate a response including information indicating a determination result of the permission or rejection and the unique identification information corresponding to the information and return the response to the second device, wherein the processor is further configured to store information indicating that the communication right acquisition request has been rejected as communication standby information.

3. The wireless communication device according to claim 2, wherein the processor is further configured to define a first-come-first-served basis as the arbitration condition, and when the plurality of communication right acquisition requests are received from the second device, the processor permits communication for an application corresponding to a communication right acquisition request that is received earliest.

4. The wireless communication device according to claim 2, wherein the processor is further configured to define priorities for the plurality of applications as the arbitration condition, and when the plurality of communication right acquisition requests are received from the second device, the processor permits communication for an application having a highest one of the priorities.

5. The wireless communication device according to claim 2, wherein the processor is further configured to:

generate display information of the determination result of the permission or rejection based on the information indicating the determination result of the permission or rejection and cause a display included in the wireless communication device to display the display information.

6. A recording medium storing a set of instructions for causing the processor included in the wireless communication device according to claim 2 to execute processing in the wireless communication device.

7. The wireless communication device according to claim 3, the processor further configured to:

generate display information of the determination result of the permission or rejection based on the information indicating the determination result of the permission or rejection and cause a display included in the wireless communication device to display the display information.

8. The wireless communication device according to claim 4, the processor further configured to:

generate display information of the determination result of the permission or rejection based on the information indicating the determination result of the permission or rejection and cause a display included in the wireless communication device to display the display information.

9. A recording medium storing a set of instructions for causing the processor included in the wireless communication device according to claim 3 to execute processing in the wireless communication device.

10. A recording medium storing a set of instructions for causing the processor included in the wireless communication device according to claim 4 to execute processing in the wireless communication device.

11. A recording medium storing a set of instructions for causing the processor included in the wireless communication device according to claim 5 to execute processing in the wireless communication device.

12. A wireless communication device used as a second device in a wireless communication system, the wireless communication system including a first device and the second device, the first device configured to generate transmission target data, the second device including a plurality of applications, each of the plurality of applications configured to perform data transfer processing, the second device configured to perform transfer processing of the transmission target data with the first device under control of the plurality of applications, the first device including a function configured to determine, when a plurality of communication right acquisition requests are received from the second device, permission or rejection of communication for each of the plurality of applications that are request sources based on unique identification information of each of the plurality of applications included in the corresponding one of the plurality of communication right acquisition requests and an arbitration condition set in advance, generate a response including information indicating a determination result of the permission or rejection and the unique identification information corresponding to the information, and return the response to the second device, the wireless communication device comprising:

a processor configured to:

determine success or failure of acquisition of a communication right for each of the plurality of applications based on the information indicating the determination result of the permission or rejection and the unique identification information corresponding to the information that are included in the response returned from the first device in response to transmission of the corresponding one of the plurality of communication right acquisition requests; and, execute the transfer processing of the transmission target data by an application having succeeded in acquiring the communication right among the plurality of applications based on a determination result of the success or failure, wherein the processor is further configured to determine whether there is a communication right acquisition request on standby, and to execute the transfer processing of the transmission target data by an application being on standby for communication.

13. The wireless communication device according to claim 12, wherein the processor is further configured to:

generate display information for displaying the determination result of the success or failure based on information indicating the determination result of the success or failure and cause a display included in the wireless communication device to display the display information.

14. A recording medium storing a set of instructions for causing the processor included in the wireless communication device according to claim 12 to execute processing in the wireless communication device.

15. A recording medium storing a set of instructions for causing the processor included in the wireless communication device according to claim 13 to execute processing in the wireless communication device.

16. A wireless communication method executed by a wireless communication system, the wireless communication system including a first device including a first device processor and a second device including a second device processor, the first device configured to generate transmission target data, the second device including a plurality of applications, each of the plurality of applications configured to perform data transfer processing, the second device configured to perform transfer processing of the transmission target data with the first device under control of the plurality of applications, the wireless communication method comprising:

by the second device, generating and transmitting a communication right acquisition request including unique identification information of each of the plurality of applications when the corresponding one of the plurality of applications makes a request to the first device for communication;

by the first device, determining, when a plurality of the communication right acquisition requests are received from the second device, permission or rejection of communication for each of the plurality of applications that are request sources based on the unique identification information included in the corresponding one of the plurality of the communication right acquisition requests and an arbitration condition set in advance;

by the first device, generating a response including information indicating a determination result of the permission or rejection and the unique identification information corresponding to the information and returning the response to the second device;

by the first device, store information indicating that the communication right acquisition request has been rejected as communication standby information;

by the second device, determining success or failure of acquisition of a communication right for each of the plurality of applications based on the information indicating the determination result of the permission or rejection and the unique identification information corresponding to the information that are included in the response returned from the first device;

by the second device, executing the transfer processing of the transmission target data by an application having succeeded in acquiring the communication right among the plurality of applications based on a determination result of the success or failure; and by the second device, determining whether there is a communication right acquisition request on standby, and to execute the transfer processing of the transmission target data by an application being on standby for communication.

* * * * *